United States Patent
Hancock

(10) Patent No.: US 7,340,675 B1
(45) Date of Patent: Mar. 4, 2008

(54) SYSTEM AND METHOD FOR CREATING WEB PAGES WITH WORD PROCESSING TEMPLATES

(75) Inventor: Christopher David Hancock, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1171 days.

(21) Appl. No.: 09/853,109

(22) Filed: May 10, 2001

(51) Int. Cl.
*G06F 17/18* (2006.01)
*G06F 17/30* (2006.01)
*G06F 17/21* (2006.01)

(52) U.S. Cl. .................. 715/530; 715/500; 715/511; 715/744; 715/760; 709/204

(58) Field of Classification Search ............ 715/500.1, 715/513, 517, 522, 523, 526, 527, 530, 511, 715/744, 760; 709/204
See application file for complete search history.

(56) References Cited

U.S. PATENT DOCUMENTS 5,860,073 A * 1/1999 Ferrel et al. ................ 715/522

OTHER PUBLICATIONS

Microsoft Word® 2000 ("Word"), Microsoft Corporation, Microsoft Word® 2000 Help manual: About places to save Web pages pp. 1-14, About templates pp. 1-6, About formatting text using styles pp. 1-7, Figs. 1-21, Copyright © 1983-1999.*
Extensis BeyondPress 4.0 (hereinafter "QuarkXPress"), QuarkXPress, pp. 1-4 (available at www.qmedia.co.za/beyondpress.htm via HotBot search engine (criteria: before May 10, 2001)).*
Word Processor Filters, Oct. 31, 2000 (available at www.terrencemiao.com/Webmail/msg00406.html), pp. 1-9.*
"Multi Style II XT—3.4.3 QuarkXTension, typesetting tool", VersionTracker: Software Downloads and Updates, Copyright 1996-2006 (Version 3.4.3 was released on Oct. 18, 2000), pp. 1-4.*
"Multi Style II for QuarkXPress", ThePowerXchange, LLC, Copyright 1991-2005, pp. 1-4.*

* cited by examiner

*Primary Examiner*—Stephen Hong
*Assistant Examiner*—Matt Ludwig
(74) *Attorney, Agent, or Firm*—Perkins Coie LLP

(57) ABSTRACT

A computer-implemented system for creating files that can be viewed on the World Wide Web. The system employs an HTML authoring software module that works in conjunction with a word processing software module to create web pages. The HTML authoring software module uses the templates available in the word processing software module to create style groups. Users can invoke the style groups when converting a text document to an HTML document in order to achieve uniformity and customization with the text and HTML code that comprise a web page.

12 Claims, 13 Drawing Sheets

Architecture

Architecture

Overview of Style Mapping

Associating a Template
with a Style Group

Database Structure

| ID | Name | Style | Align-ment | Character | Start Tag | End Tag | List Type |
|---|---|---|---|---|---|---|---|
|  |  |  |  |  |  |  |  |

FIG. 7

SYSTEM AND METHOD FOR CREATING WEB PAGES WITH WORD PROCESSING TEMPLATES

TECHNICAL FIELD

The present invention is generally directed to creating customized files of information for viewing on the World Wide Web. More specifically, the present invention provides a software module that can be used in conjunction with a word processor to enable users to easily create customized web pages.

BACKGROUND OF THE INVENTION

The Internet has quickly become a popular means for transmitting information because of the world-wide access it provides to information resources. The information on the Internet is available in a variety of formats and it can have educational, entertainment, or business purposes. The World Wide Web (the "Web") is one of the largest and most popular distributed computing networks that make-up the Internet. The Web comprises interconnected computers from around the world. A computer connected to the Internet can download digital information from Web server computers. The Web comprises resources and clients that communicate digital information and instructions typically using a format known as Hypertext Markup Language (HTML). These instructions can include information for formatting text, linking to digital data, and receiving digital data.

Typically, the Web server computers that comprise the World Wide Web have files of information called web pages that can be displayed on a remote computer. A person operating the remote client computer connected to the Internet can use a software module called a browser to view the files of information available on the Web. The files of information, or web pages, can include menu choices and highlighted words that provide connections to further information.

Somewhat analogous to a yellow pages telephone directory, web pages are commonly used today to provide information. However, beyond just traditional business information available in a telephone directory, web pages can provide access to a wide variety of personal, educational, commercial, and entertainment information. Accordingly, many people, who are not necessarily proficient with HTML, have the need to create their own customized web pages.

There are a variety of ways a person can create a web page. One approach is to use one of the commercially available HTML software modules that are specifically designed for creating web pages. Another approach is to draft text for a web page with a word processor and use a conversion function available in some word processing software modules to convert the text styles into HTML code. Using a word processing environment to create web pages is advantageous because people are generally familiar with the features and tools of word processing programs. Furthermore, a word processor is a natural environment for writing the text portions of web pages without the concerns of HTML code.

However, HTML conversion features employed by conventional word processors are limited because HTML can be overly complex and inflexible to work with. This limitation can cause inconsistency in the HTML that is produced with each conversion. For example, you could have two different documents that follow largely the same design and content model, but the word processor conversion process produces disparate HTML for each. Furthermore, the conversion feature of conventional word processors does not support the customization of HTML code. Thus, when using a word processor, the writer creating the web pages often must revise and edit the HTML code after the conversion process.

In view of the foregoing, there is a need in the art for a system which will support the easy creation of web pages of varying design. Specifically, a need exists to be able to easily create web pages within the familiar environment of a word processor using the powerful templates available in most word processors. A further need exists to be able to draft web pages with HTML code achieving the desired goals of uniformity and customization.

SUMMARY OF THE INVENTION

The present invention is generally directed to a software module for creating files that can be transmitted, accessed, and read on the World Wide Web. The present invention improves upon the word processor approach to creating web pages with HTML code by utilizing the powerful templates available in most word processing programs. Specifically, the invention enables the transferring of template styles from the word processing environment to the web environment. By employing the word processing templates, the invention supports the creation of uniform and customizable text and HTML code for web pages without a need for further editing of the web pages upon conversion from the word processing environment.

In one aspect, the invention comprises a system for creating web pages using a word processing software module and an HTML authoring software module. The word processing software can be accessed by a client coupled to the server computer. Templates within the word processing software module store information describing where and how to format text in a document. The client can select a template and use the formatting capabilities of the template for creating a web page within the word processing environment. Once the client selects a template, the formatting information contained in the template can be transferred to a style group within the HTML authoring software module. The style group can be stored in a database coupled to the server computer. When a web page is drafted with the word processing software module and converted into an HTML document, the style groups of the HTML authoring software module enable uniform and customized text and code within the finished web page.

The present invention further provides a method for creating web pages using a style mapping feature of an HTML authoring software module. The method comprises selecting a template within a word processing software module, associating the template with a style group in the HTML authoring software module, and transferring particular format information from the template to the style group. The method enables a client using a word processing software module and the HTML authoring software module to create web pages with uniform and customizable text and HTML code. Using the style group, the client can also add macros to the web page and insert comments or instructions in the file header or body of the web page. Once a style group is created, the client can store it for subsequent use in creating other web pages.

In another aspect, the invention provides a method for creating markup language documents with a word processing software module. The method comprises selecting a first template within a word processing software module, associating the first template with a second template in a markup language software module, and transferring format information from the first template to the second template. The method enables a client to create a document with the word processing software module and convert the document into a markup language using the formatting information available in the first template. By using the format information, the markup language document comprises uniform and custom text and code. The client can also insert macros or comments into the markup language document with the second template. The second template can be stored so that it can be reused to create other markup language documents.

These and other aspects of the invention will be described below in connection with the drawing set and the appended specification and claim set.

BRIEF DESCRIPTION OF THE DRAWINGS

FIG. 7 is a block illustrating an exemplary data structure for storing information associated with a style group.

DETAILED DESCRIPTION OF THE EXEMPLARY EMBODIMENTS

Figure 1:
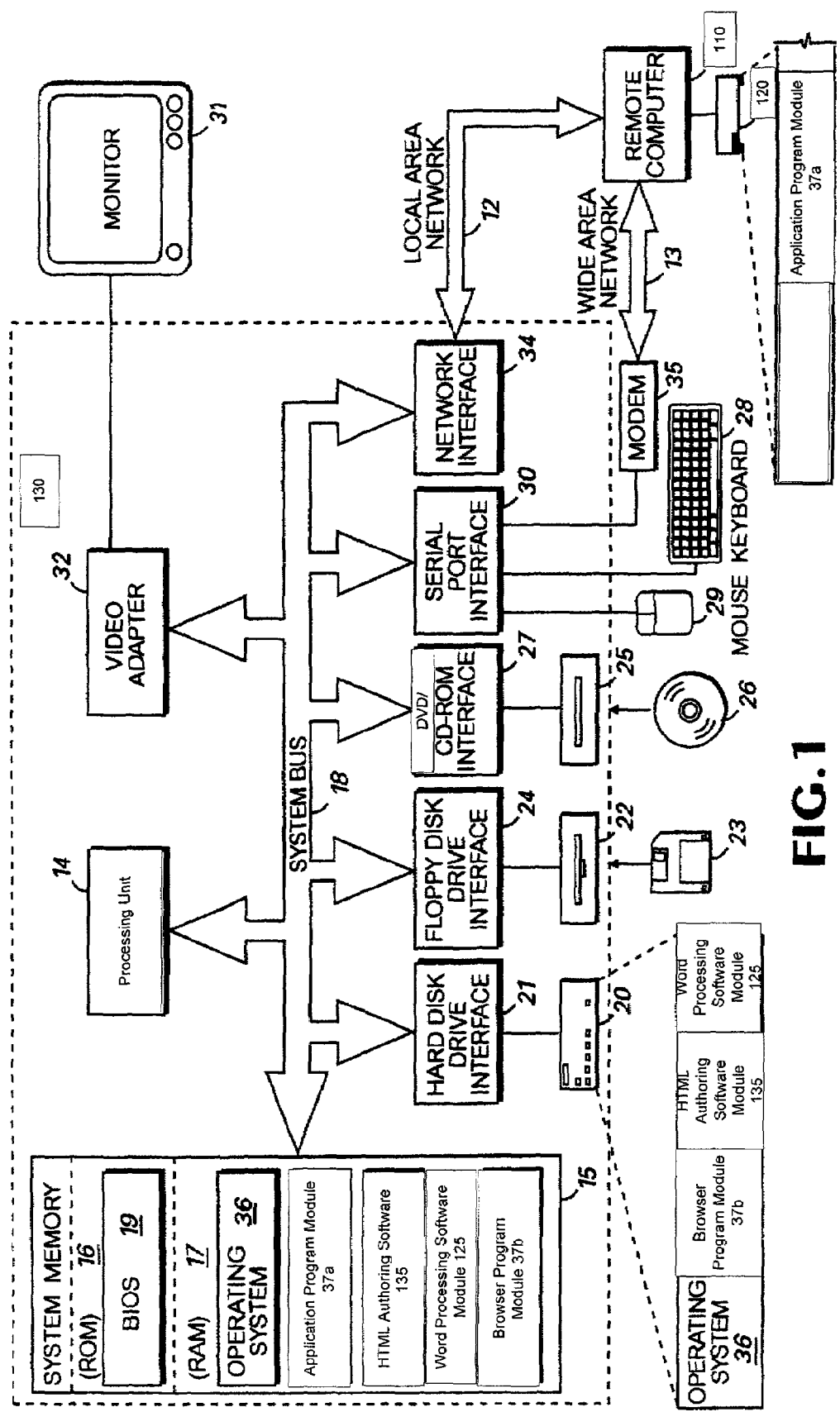
FIG. 1 is a functional block diagram illustrating the operating environment for an exemplary embodiment of the present invention.

The present invention enables users to create web pages using a markup language authoring software module that works with a word processing software module. Specifically, the present invention utilizes the template functions available in a word processing software module to create predetermined formats for drafting web pages. This is a significant improvement over conventional approaches to drafting web pages with word processing software modules. In utilizing the template functions, the present invention enables the creation of web pages with desired uniformity and customization. The operation of the present invention is described within the representative environment of the Hypertext Markup Language (HTML). Alternative embodiments of the invention support the use of other markup languages including, but not limited to, Dynamic HTML (DHTML) and Extensible Markup Language (XML).

Although the exemplary embodiments will be generally described in the context of software modules running in a distributed computing environment, those skilled in the art will recognize that the present invention also can be implemented in conjunction with other program modules for other types of computers. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations in a distributed computing environment by conventional computer components, including remote file servers, remote computer servers, remote memory storage devices, a processing unit, memory storage devices, display devices and input devices. Each of these conventional distributed computing components is accessible by the processing unit via a communications network.

The processes and operations performed by the computer include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention also includes a computer program which embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer program will be explained in more detail in the following description in conjunction with the remaining figures illustrating the program flow.

Referring now to the drawings, in which like numerals represent like elements throughout the several figures, aspects of the present invention and the preferred operating environment will be described.

FIG. 1 illustrates various aspects of an exemplary computing environment in which the present invention is designed to operate. Those skilled in the art will appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 130 suitable for supporting the operation of the preferred embodiment of the present invention. As shown in FIG. 1, the personal computer 130 operates in a networked environment with logical connections to a remote server 110. The logical connections between the personal computer 130 and the remote server 110 are represented by a local area network 12 and a wide area network 13. Those of ordinary skill in the art will recognize that in this client/server configuration, the remote server 110 may function as a file server or computer server.

The personal computer 130 includes a processing unit 14, such as "PENTIUM" microprocessors manufactured by Intel Corporation of Santa Clara, Calif. The personal computer also includes system memory 15, including read only memory (ROM) 16 and random access memory (RAM) 17, which is connected to the processor 14 by a system bus 18. The preferred computer 130 utilizes a BIOS 19, which is stored in ROM 16. Those skilled in the art will recognize that the BIOS 19 is a set of basic routines that helps to transfer information between elements within the personal computer 130. Those skilled in the art will also appreciate that the present invention may be implemented on computers having other architectures, such as computers that do not use a BIOS, and those that utilize other microprocessors.

Within the personal computer 130, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM or DVD drive 25, which is used to read a CD-ROM or DVD disk 26, is connected to the system bus 18 via a CD-ROM or DVD interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote server 110 in this networked environment is connected to a remote memory storage device 33. This remote memory storage device 120 is typically a large capacity device such as a hard disk drive, CD-ROM or DVD drive, magneto-optical drive or the like. Those skilled in the art will understand that program modules, such as an application program module 37a, are provided to the remote server 110 via computer-readable media. The personal computer 10 is connected to the remote server 110 by a network interface 34, which is used to communicate over the local area network 12.

In an alternative embodiment, the personal computer 130 is also connected to the remote server 110 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 130, those of ordinary skill in the art can recognize that the modem 35 may also be internal to the personal computer 130, thus communicating directly via the system bus 18. It is important to note that connection to the remote server 110 via both the local area network 12 and the wide area network 13 is not required, but merely illustrates alternative methods of providing a communication path between the personal computer 130 and the remote server 110.

Although other internal components of the personal computer 130 are not shown, those of ordinary skill in the art will appreciate that such components and the interconnection between them are well known. Accordingly, additional details concerning the internal construction of the personal computer 130 need not be disclosed in connection with the present invention.

Those skilled in the art will understand that program modules, such as an operating system 36, an application program module 37a, a browser program module 37b, a word processing software module 125, an HTML authoring software module 135, and data are provided to the personal computer 130 via computer-readable media. In the preferred computer, the computer-readable media include the local or remote memory storage devices, which may include the local hard disk drive 20, floppy disk 23, CD-ROM or DVD 26, RAM 17, ROM 16, and the remote memory storage device 120. In the preferred personal computer 130, the local hard disk drive 20 is used to store data and programs.

Figure 2:
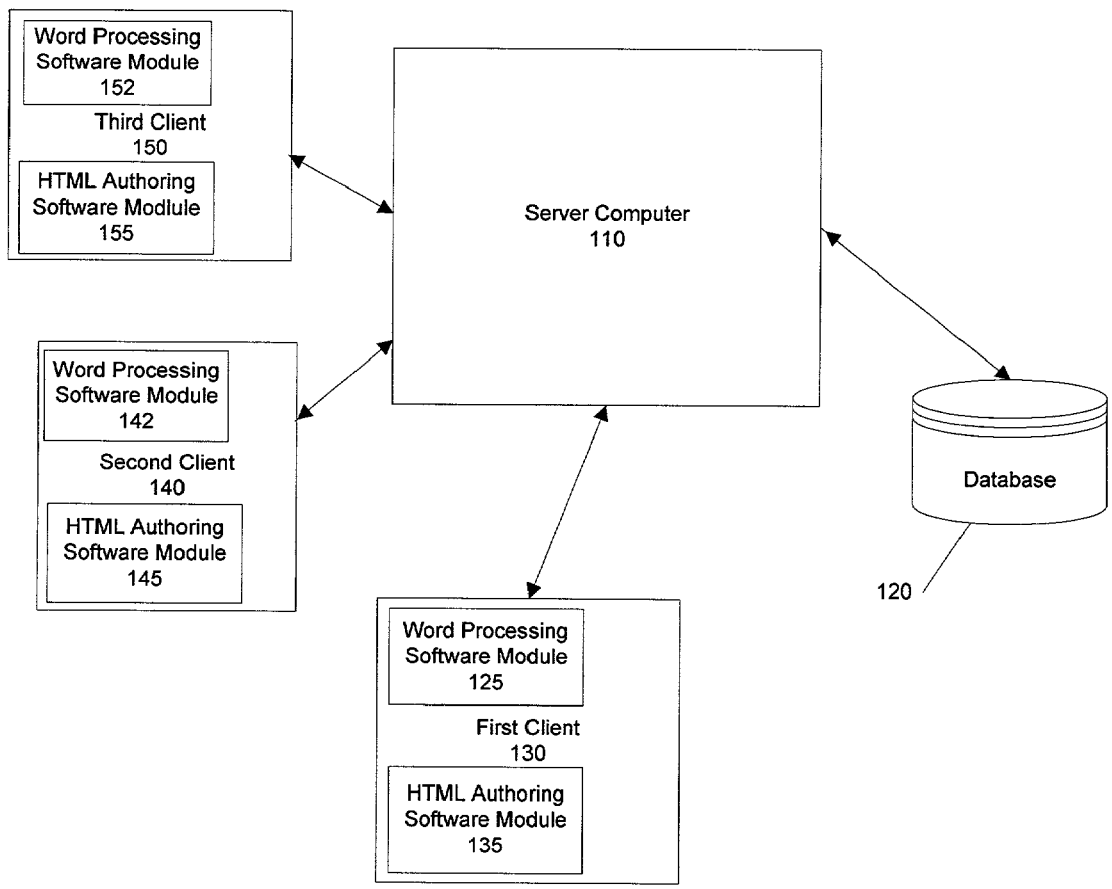
FIG. 2 is a functional block diagram illustrating the architecture of a distributed computing network in accordance with an exemplary embodiment of the present invention.

FIG. 2 illustrates an exemplary architecture in which the present invention can operate. FIG. 2 shows a distributed computing environment wherein a First Client 130, a Second Client 140 and a Third Client 150 are coupled to a server computer 110. Word processing software modules 125, 142, and 152 can be operating on clients 130, 140, and 150 coupled to the server computer 110. HTML authoring software modules 135, 145, and 155 also can be operating on each client and work in conjunction with the word processing software modules 125, 142, and 152. A database 120, coupled to the server computer 110, can store meta-data created by an HTML authoring software module 135. A First Client 130 can access the word processing software module 125 to create text for web pages. First Client 130 can also use the HTML authoring software module 135 to assist in creating web pages with uniform and customizable HTML code. Although it is not shown in FIG. 2, and is not necessary for the operation of the invention, the server computer 110 can also be coupled to a wide area network, such as the world wide web. In alternative embodiments of the present invention, other architectures may be employed wherein software modules are stored and operated in varying local and remote locations.

Figure 3:
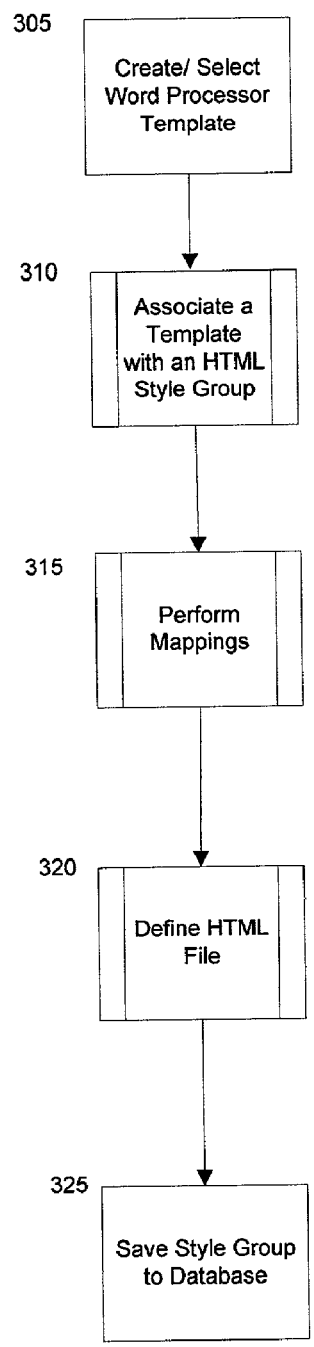
FIG. 3 is a logic flow diagram illustrating an overview of an exemplary style mapping process employed by an HTML authoring software module.

Referring to FIG. 3, a logic flow diagram is shown illustrating an overview of the style mapping procedure supported by the HTML authoring software module 135. In Step 305, First Client 130 working with word processing software module 125 can either create or select a word processing template. A word processing template can contain predetermined information about how to format particular characters or text within a document. A template can also contain predefined selections for character fonts and styles within the text. In Step 310, using the HTML authoring software module 135, First Client 130 associates a template in the word processing software module 125 with an HTML style group and assigns a style group name for the particular template. In step 315, First Client 130 maps the word processing template styles to the HTML environment. In the mapping process, First Client 130 can select particular features of a template and where to adopt them within the web page. In step 320, First Client 130 defines the HTML file by inserting instructions or attributes into the file header portion of the HTML style group. In step 325, First Client 130 can save the style group that was just created to a database 120 so that it can be used again in the future by First Client 130 or other clients to create web pages. The foregoing steps illustrate an exemplary process for using word processing templates to create web pages.

Figure 4:
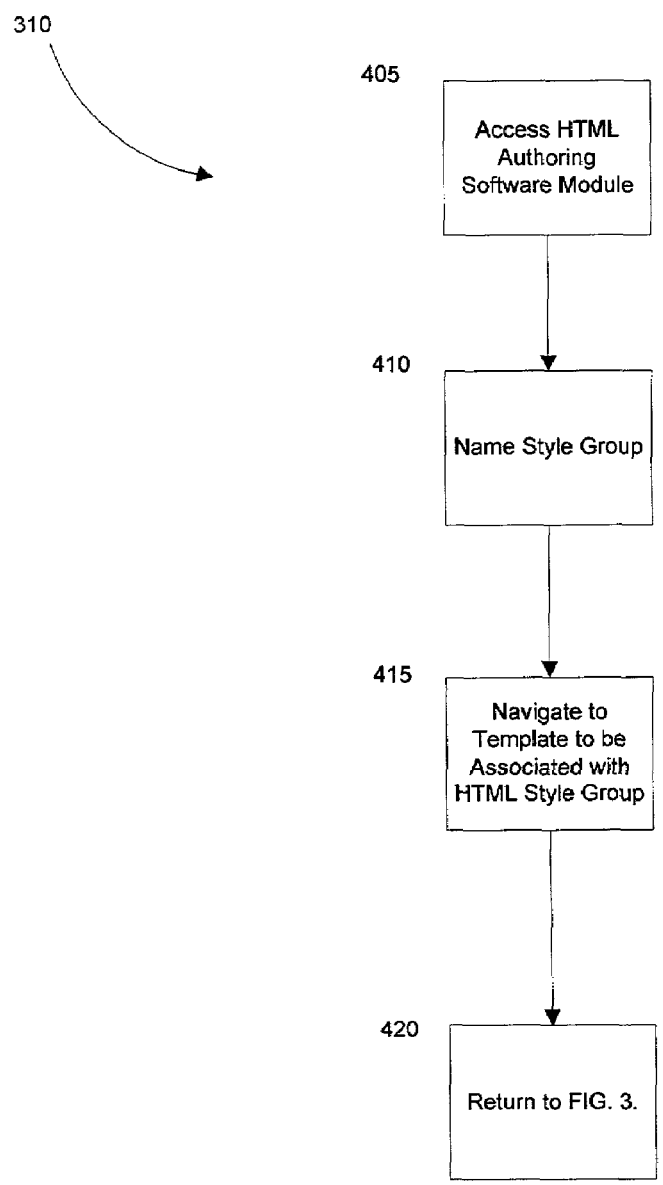
FIG. 4 is a logic flow diagram illustrating an exemplary process for associating a template with a style group.

FIG. 4 illustrates an exemplary sub-process for associating a template with a style group as described in Step 310 of FIG. 3. In Step 405, First Client 130 accesses the HTML authoring software module 135. In Step 410, First Client 130 can name the style group that is to be created. First Client 130, gives the style group a name so that it can be identified and used in the future for creating different web pages. In Step 415, First Client 130 navigates to the template within the word processing software module 125 that is to be associated with the particular style group. In step 420, First Client 130 returns to Step 315 of the overview flow chart diagram illustrated in FIG. 3.

Figure 5:
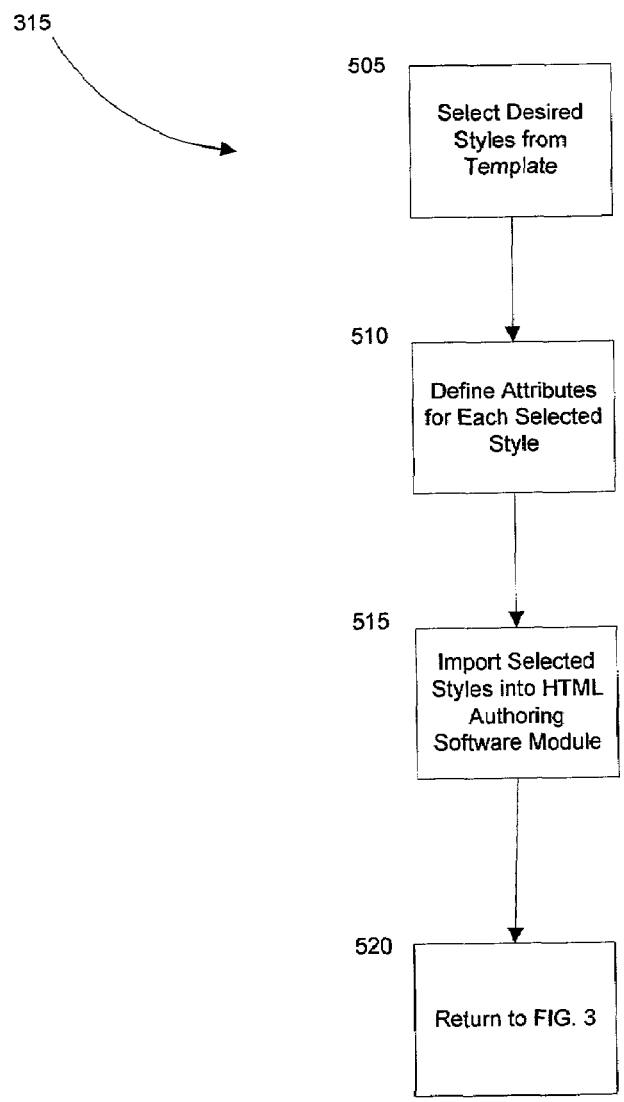
FIG. 5 is a logic flow diagram illustrating an exemplary process for performing mappings.

Referring to FIG. 5, an exemplary sub-process for performing mappings, as referred to in Step 315 of FIG. 3, is illustrated. In Step 505, First Client 130 can select from a variety of styles and formats in the particular template. In Step 510, First Client 130 defines the attributes for each of the selected styles from Step 505. By defining attributes, First Client 130 can select the locations within the web page for particular character fonts and formats. In Step 515, when First Client 130 has completed defining the desired attributes, the HTML software module 135 imports the selected styles from the word processing software module 125 into the style group. In step 520, First Client 130 returns to step 320 of the overview style mapping process illustrated in FIG. 3.

Figure 6:
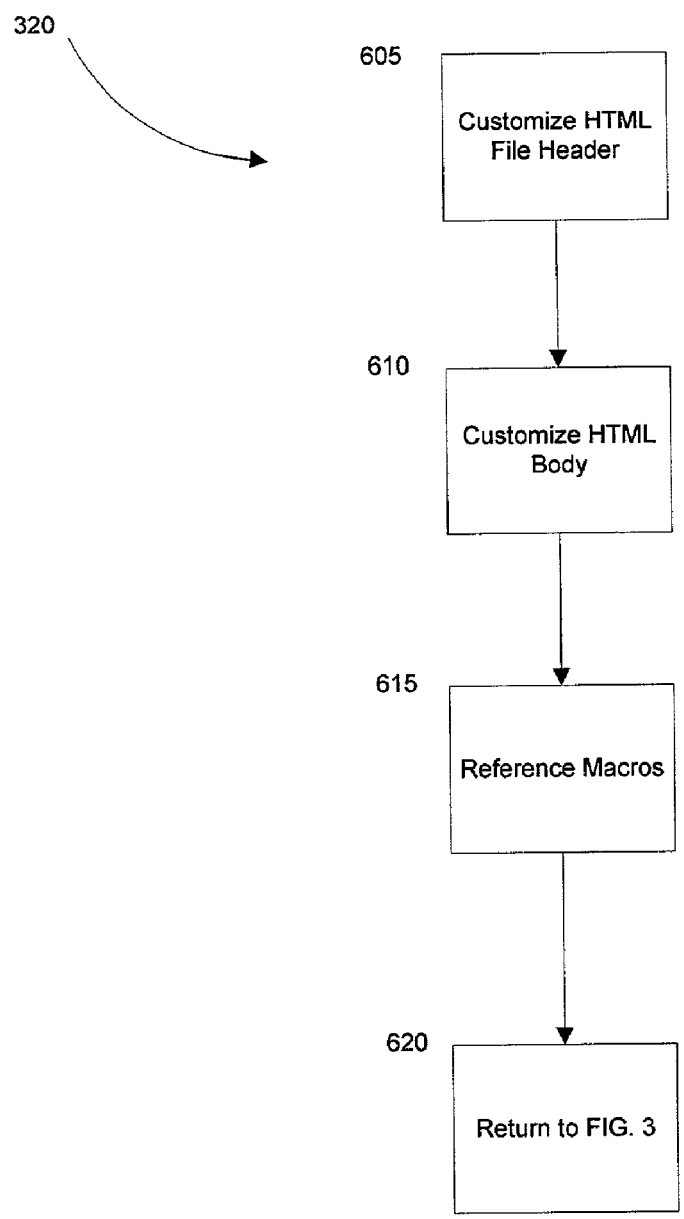
FIG. 6 is a logic flow diagram illustrating an exemplary process for defining an HTML file.

After the format information is transferred to the style group, First Client 130 can input descriptive or identifying information into the style group that will automatically be inserted into the web page. FIG. 6 illustrates an exemplary sub-process for defining an HTML file as referred to in Step 320 of FIG. 3. In Step 605, First Client 130 can customize the HTML file header. Typically, instructions or attributes concerning the web page are inserted into the file header. These instructions or attributes are not displayed in the ultimate web page, but are inserted to assist others working in the creation of the web pages for a web site. In Step 610, First Client 130 can also customize the HTML body by inserting comments at various places within the body of the web page. In Step 615, First Client 130 can also insert references to macros that can also customize the ultimate HTML document. Once First Client 130 has completed defining the HTML file, in Step 620, First Client 130 is returned to step 325 of FIG. 3 where the style group is saved to database 120.

FIG. 7 illustrates an exemplary data base structure for storing the information associated with a particular style group. For a particular style group, First Client 130 can select how portions of text are to be aligned on the web page. Tags contain information about the types of fonts to be used and identify where on the web page these attributes are employed.

Figure 8:
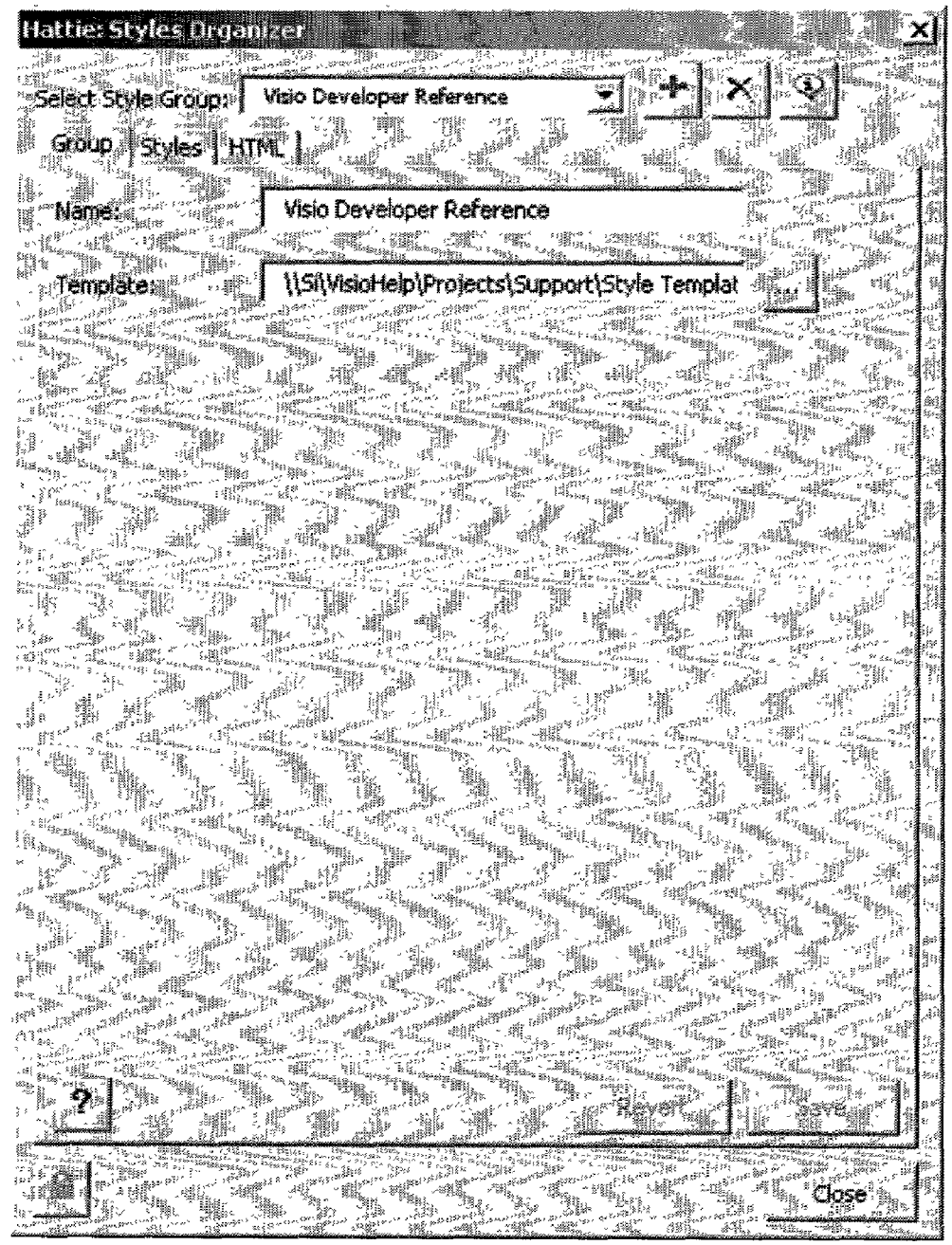
FIG. 8 illustrates an exemplary display screen for creating a style group according to one embodiment of the present invention.

When First Client 130 accesses its HTML authoring software module 135, a display screen, such as the one in FIG. 8, can be shown. In this exemplary display, First Client 130 has selected a style group with the name "Visio Developer Reference." The exemplary display screen in FIG. 8 also shows the template, in this case its the "Visio Developer Reference," with which the style group is associated.

Figure 9:
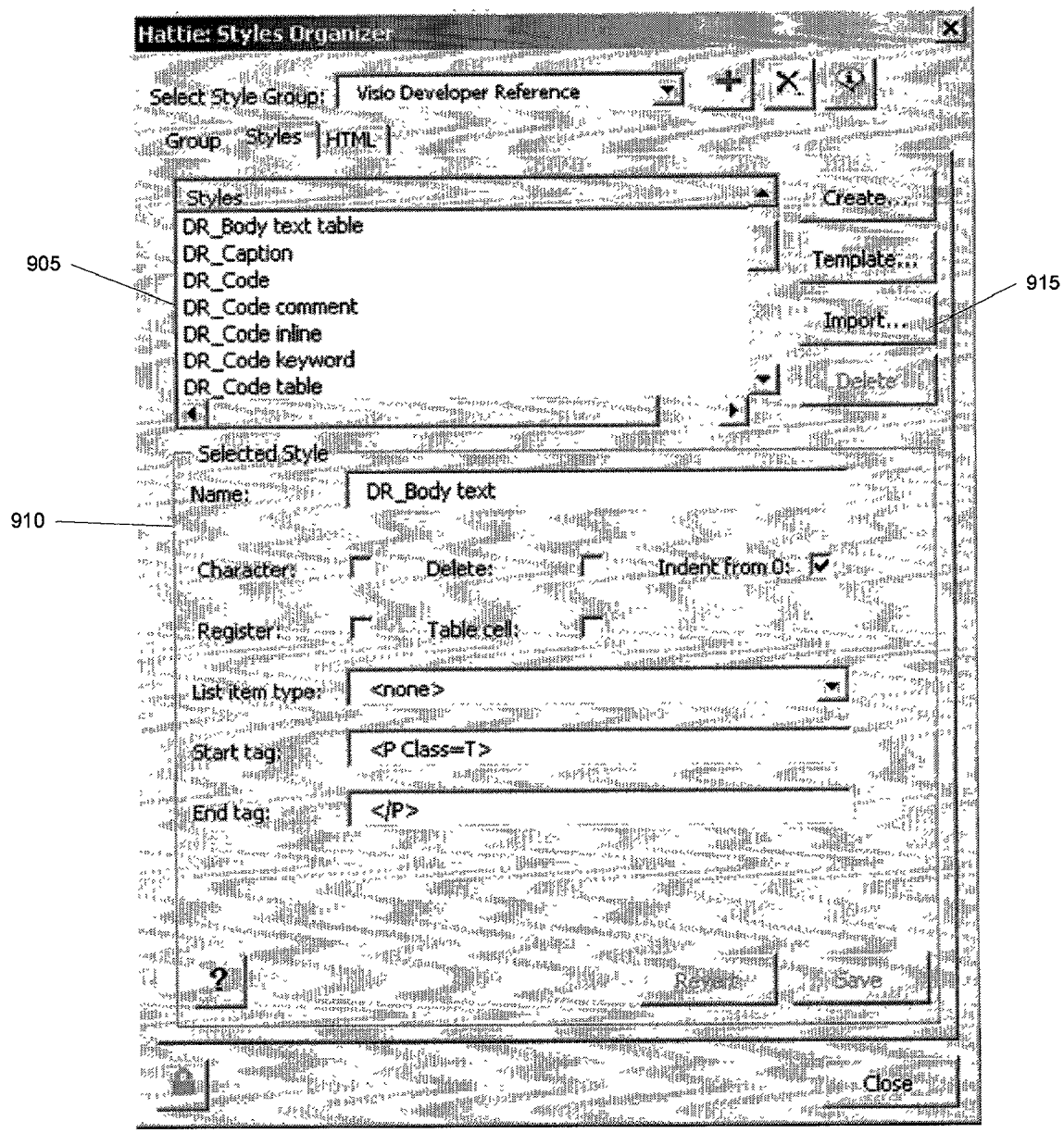
FIG. 9 illustrates an exemplary display screen for selecting styles from a template according to one embodiment of the present invention.
Figure 10:
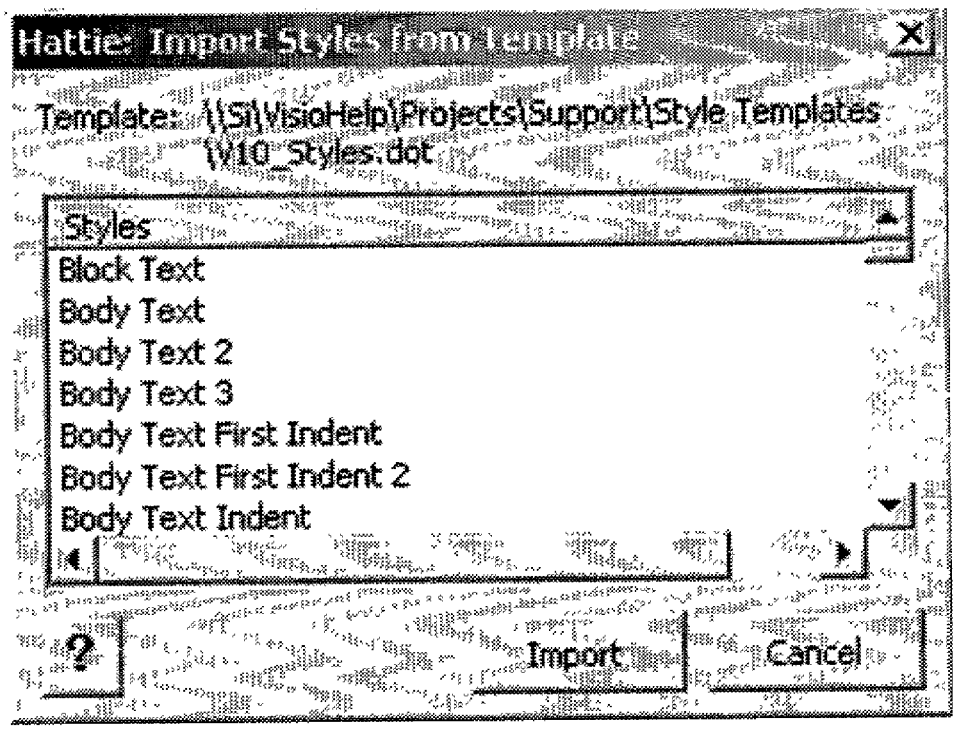
FIG. 10 illustrates an exemplary display screen for importing styles from a template according to one embodiment of the present invention.
Figure 11:
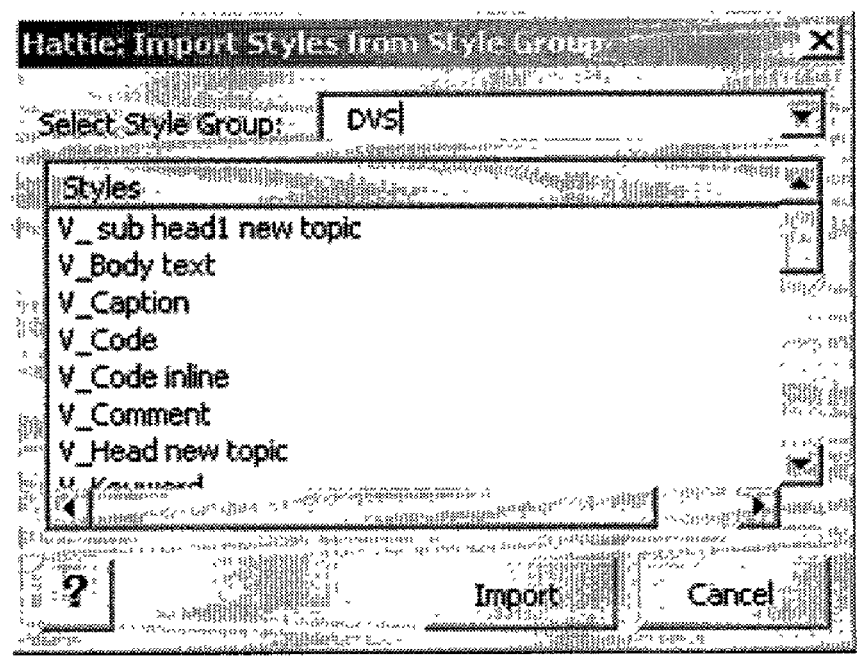
FIG. 11 illustrates an exemplary display screen for importing styles from another style group according to one embodiment of the present invention.

Referring to FIG. 9, an exemplary display associated with Step 315 of FIG. 3 is illustrated. In window 905, the various styles associated with this particular template are listed. First Client 130 can select any of the desired styles from window 905 and further define where those styles will be employed on the web page in window 910. When First Client 130 has finished selecting styles, the Import option 915 is selected. FIG. 10 illustrates an exemplary display in response to the selection of the Import option 915. The display in FIG. 10 lists all of the selected styles from the chosen template. Alternatively, when a client is creating a new style group, styles from previously created style groups can also be used. FIG. 11 shows an exemplary display for importing styles from a previously created style group into a new style group.

Figure 12:
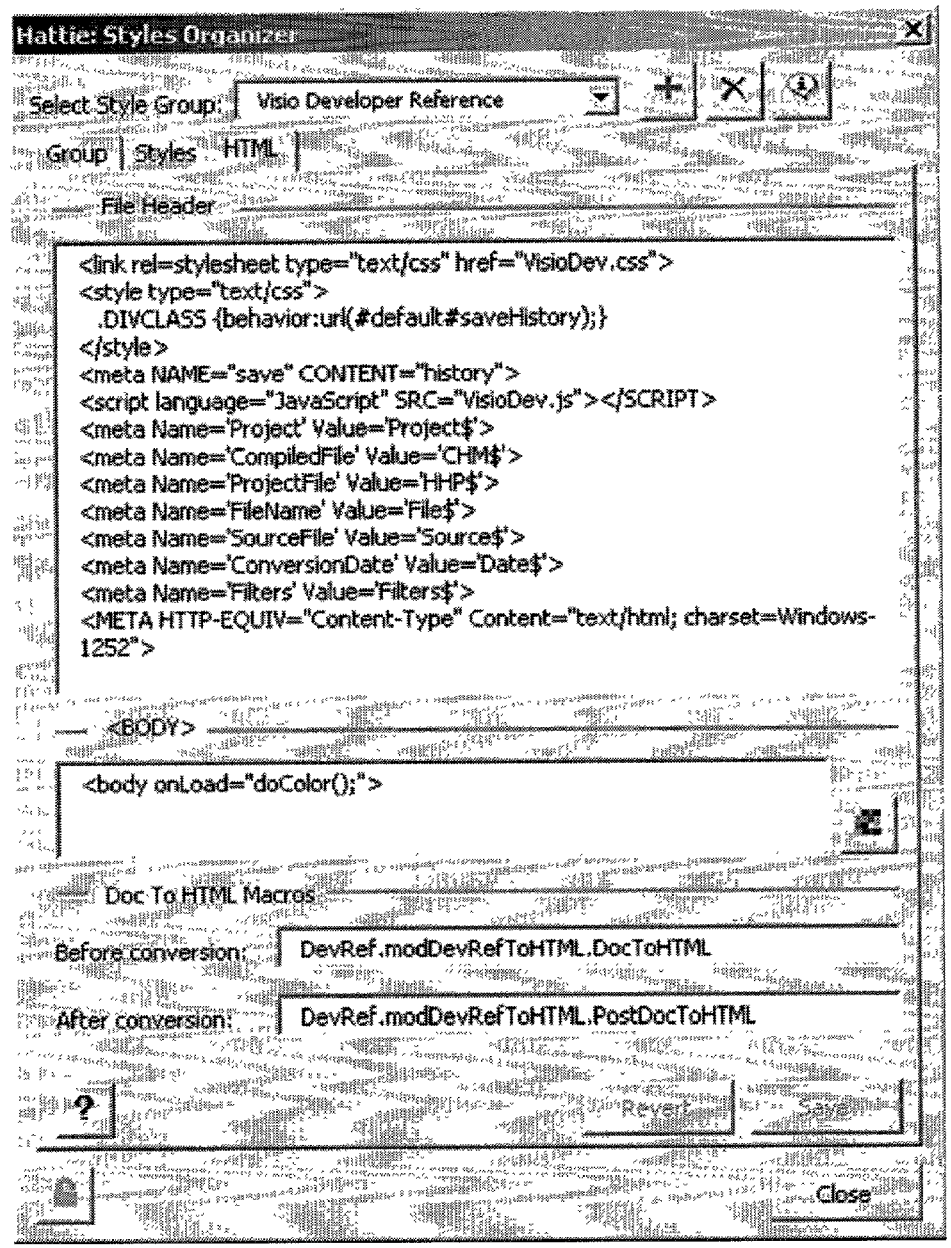
FIG. 12 illustrates an exemplary display screen for defining an HTML file according to one embodiment of the present invention.

FIG. 12 illustrates an exemplary display screen associated with defining an HTML file as described in Step 320 of FIG. 3. In window 1205, comments and attributes are inserted into the file header regarding the web page. Similarly, in window 1210, comments and attributes can be inserted at various places within the body of the web page. First Client 130 can also insert macros in various places within the web page using window 1215. The foregoing displays are merely examples and other layouts and displays may be used in association with an HTML authoring software module.

Figure 13:
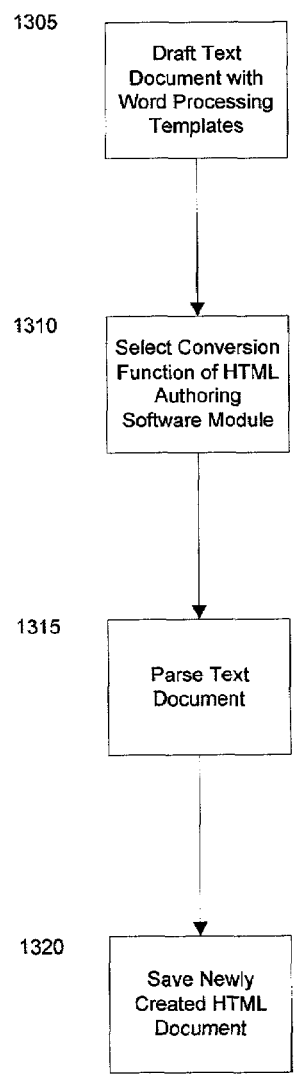
FIG. 13 is a logic flow diagram illustrating an exemplary process for creating a web page with style groups.

FIG. 13 illustrates an exemplary process for creating a web page after a user has established style groups. In step 1305, First Client 130 drafts a text document using word processing software module 125. While drafting the document, First Client 130 can use the templates available in the word processing software module 125 to achieve uniformity and customization in the ultimate HTML document. In step 1310, First Client 130 accesses the conversion function of the HTML authoring software module 135 to convert the text document to an HTML document. In step 1315, the HTML authoring software module 135 parses through the text document and identifies template styles. Identified template styles are replaced with HTML tags stored in the style group associated with the particular template. In step 1320, the newly created HTML document is saved for use on the web.

In conclusion, the present invention enables and supports the creation of uniform and customizable web pages. The invention takes the benefits associated with word processing templates and applies them to the creation of web pages. The general familiarity with word processing software modules makes it a desirable environment within which to draft the text used in web pages.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalence thereof. For instance, the present invention could be used with markup languages other than HTML such as DHTML and XML. In another embodiment, the style groups can be integrated with the templates in the word processing environment. Although the present invention has been described as operating on either a stand alone computer or a local computing network, it should be understood that the invention can be applied to other types of distributed computing environments.

What is claimed is:

1. A method for creating a web page in the environment of a word processing software module comprising the steps of:

selecting a template while using the word processing software module, the template operable for storing styles;

associating the template with a style group belonging to a markup language software module, the style group operable for storing styles that provide a format for creating the web page, the associating the template comprising:
    accessing the markup language software module;
    naming the style group from within the markup language software module; and
    locating the template that is to be associated with the style group from within the markup language software module;
selecting the styles from the associated template;
defining attributes for the selected styles, the attributes operable for identifying characters used in the web page;
importing the selected styles into the style group belonging to the markup language software module;
accessing the selected styles from the associated template by the markup language software module; and
storing the style group for subsequent use in creating the web page.

2. The method of claim 1, further comprising the step of defining instructions for the style group, the instructions operable for providing information about the web page.

3. The method of claim 2, wherein the step of defining instructions for the style group comprises customizing a file header for storing information about the web page.

4. The method of claim 2, wherein the step of defining instructions for the style group comprises customizing the body of the web page.

5. The method of claim 2, wherein the step of defining instructions for the style group comprises referencing macros with the style group.

6. A computer-readable medium having computer-executable instructions for performing the steps recited in claim 1.

7. A method for creating a markup language document with a word processing software module, the markup language document to be transmitted in a distributed computing environment, comprising the steps of:
    selecting a first template while using the word processing software module, the first template operable for storing formatting information;
    associating the first template with a second template for creating the markup language document, the second template associated with a markup language software module, the associating the first template with the second template comprising:
        accessing the markup language software module;
        identifying the second template from within the markup language software module; and
        locating the first template that is to be associated with the second template from within the markup language software module;
    selecting formatting information from the first template;
    defining attributes for the selected formatting information, the attributes operable for identifying characters used in the markup language document;
    importing the selected formatting information into the second template associated with the markup language software module for creating the markup language document, such that the selected formatting information from the first template is accessible by the markup language software module; and
    storing the second template.

8. The method of claim 7, further comprising the step of defining instructions for the second template, the instructions operable for providing information that is not displayed in the markup language document.

9. The method of claim 8, wherein the step of defining instructions for the second template comprises customizing a file header of the markup language document.

10. The method of claim 8, wherein the step of defining instructions for the second template comprises customizing the body of the markup language document.

11. The method of claim 8, wherein the step of defining instructions for the second template comprises referencing macros with the second template, the macros to be inserted into the markup language document.

12. A computer-readable medium having computer-executable instructions for performing the steps recited in claim 7.

* * * * *